United States Patent [19]

Svensson

[11] Patent Number: 4,878,158
[45] Date of Patent: Oct. 31, 1989

[54] SUN VISOR ASSEMBLY FOR MOTOR VEHICLES, WITH AN ILLUMINATED REAR-VIEW MIRROR

[75] Inventor: E. Gunnar Svensson, Malung, Sweden

[73] Assignee: Autopart Sweden AB, Malung, Sweden

[21] Appl. No.: 259,148

[22] Filed: Oct. 18, 1988

[30]  Foreign Application Priority Data

Oct. 28, 1987 [SE]  Sweden ................................ 8704199

[51] Int. Cl.⁴ .............................................. F21V 33/00
[52] U.S. Cl. ..................................... 362/140; 296/97.5
[58] Field of Search ............................... 362/135–137, 362/140–142, 144; 296/97.1, 97.5

[56]  References Cited

U.S. PATENT DOCUMENTS

| 4,227,242 | 10/1980 | Marcus | 362/140 |
| 4,486,819 | 12/1984 | Marcus et al. | 362/142 |
| 4,734,831 | 3/1988 | Keyser et al. | 362/142 |
| 4,744,645 | 5/1988 | Sharp | 362/144 |

FOREIGN PATENT DOCUMENTS 0265404  4/1988  European Pat. Off. ........... 296/97.5

Primary Examiner—Carroll B. Dority
Attorney, Agent, or Firm—Young & Thompson

[57]  ABSTRACT

A sun visor assembly comprising a mirror and lighting unit (5) and including a mirror (6) which serves as a base plate and the rear side of which is intended to be glued directly on to the bottom surface of a recess in a sun-visor body. All of the lighting components (10, 11, 12, 13, 16) are mounted on the front surface of the mirror.

5 Claims, 1 Drawing Sheet

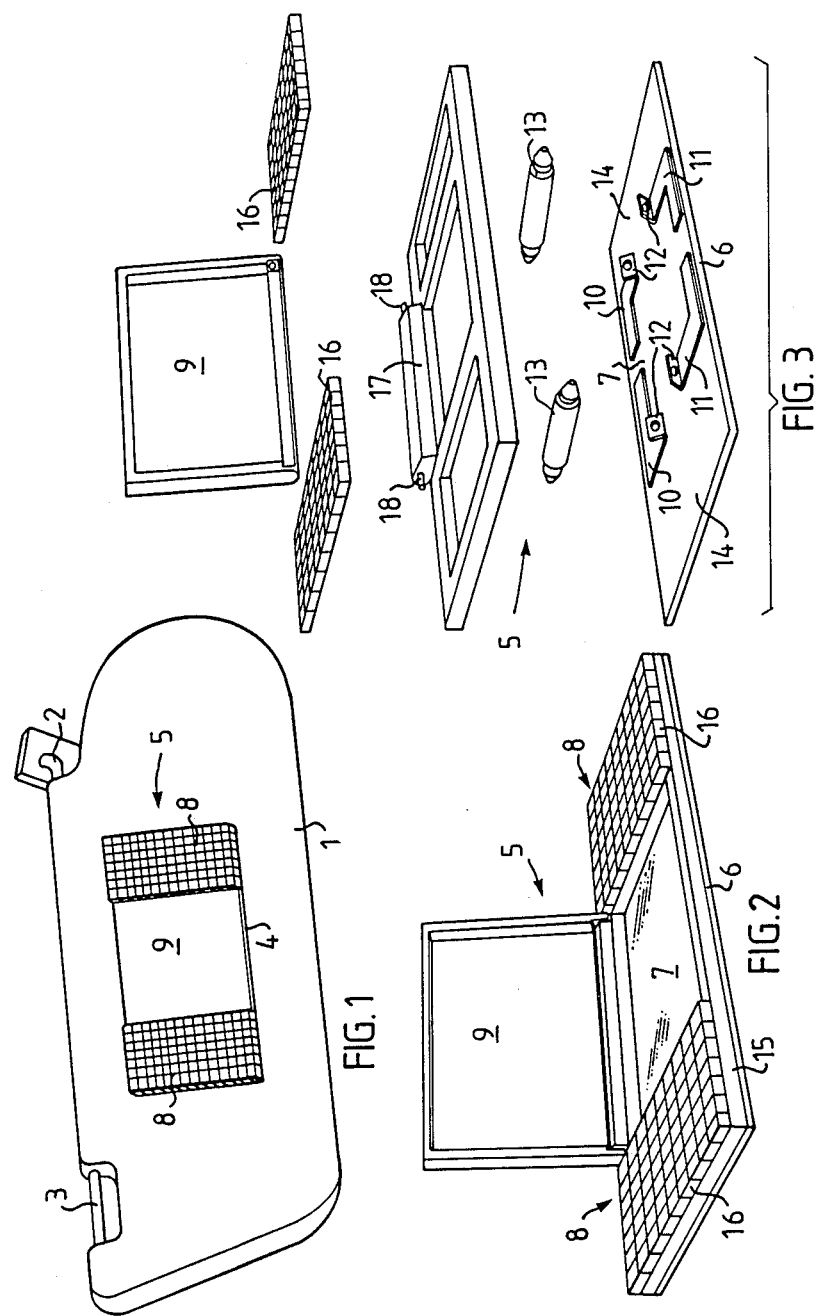

SUN VISOR ASSEMBLY FOR MOTOR VEHICLES, WITH AN ILLUMINATED REAR-VIEW MIRROR

The present invention relates to a sun visor assembly intended for automotive vehicles and comprising an elongated body, preferably made of cast foamed plastic, and a mirror and mirror lighting.

A sun visor assembly of this kind is known, e.g., from U.S. Pat. No. 4,075,468, in which separate lighting units are arranged on each short side of the actual mirror. The mirror is mounted rigidly in a frame in which the various components of the lighting units are also fitted, e.g. bulb or lamp holders, reflectors and glass. Bonded to the back of the mirror is a foam tape, behind which there is arranged a circuit card for the electric circuit. The frame also supports a pivoted cover which when swung down will cover the mirror and the lighting units. The described components are assembled to form a unit which is screwed firmly to the actual sun visor itself.

A characteristic feature of this known construction is that it comprises a large number of components and requires the actual sun visor body to comprise at least a hard core to which the mirror and lighting units can be screwed. The construction is therefore costly, not only because of the large number of components involved, but primarily because the task of assembling the components is complicated and requires a sun visor body of particular and complicated configuration.

The object of the present invention is to provide a sun visor assembly of the aforesaid kind which is of simpler construction than the described known sun visor assembly and can be produced at lower costs, without needing to detract from the requirements of good function, traffic safety and an attractive appearance.

This object is achieved in accordance with the invention by gluing the rear side of the mirror directly onto the plate, and by mounting the lighting on the front side of the mirror directly on the mirror surface.

By using the front of the mirror itself as a component carrying surface, the whole of the rear side of the mirror is left completely smooth, therewith enabling the mirror to be glued directly onto a smooth surface of the foam-plastic body which forms the actual sun visor body and which thus takes over the function of the foam-plastic tape of the known construction, i.e. to bind any pieces of glass that might break loose from the mirror should the mirror be struck by the head of a vehicle occupant. Neither does the glue joint between the mirror and the sun visor body of the inventive construction require the body to have a hard surface, as in the case of the known assembly. The surface of the mirror serves as a reflector for lighting units arranged directly on the mirror, which eliminates the need of separate reflectors.

The invention is described in more detail herebelow with reference to exemplifying embodiments thereof illustrated in the accompanying drawing, in which FIG. 1 is a front view of a sun visor, FIG. 2 is a perspective view of the mirror and lighting unit of the sun visor assembly illustrated in FIG. 1, and FIG. 3 is an exploded view of the unit illustrated in FIG. 2.

In FIG. 1 the reference numeral 1 identifies a sun visor body which comprises a foamed-plastic plate and a foil cover, and which incorporates a journal bearing for a main rod 2, a holder for a shaft 3 and a steel-rod stiffening frame, and thereby forms a vehicle sun visor of known kind. The plate is configured with a recess 4 in which there is mounted a mirror and lighting insert which is generally referenced 6 in the drawing.

The insert 5 is illustrated separately in FIG. 2 and comprises a rectangular mirror 6 which is made of glass, metal or a metallized plastic and has a mirror surface 7, a respective lighting unit 8 located on each side of the mirror surface 7, and a cover 9 which is pivotally mounted on the upper edge of the mirror 6 and which, in the case of the illustrated embodiment, will cover the mirror when lowered (FIG. 1), although the cover may also be dimensioned to cover also the lighting units 8 when in its lowered position.

The component parts of the insert 5 are shown in FIG. 3. As will be seen from the figure, the mirror 6 forms a base plate and carrier for all components of the insert. Firmly glued to the front surface of the mirror, to one side of the mirror surface 7, are two electric contact plates 10, 11 which are intended to be connected to the electrical system of the vehicle via a switch (not shown) which can be controlled by the up and down movement of either the cover or the sun visor. The contact plates 10, 11 have tabs 12 which project upwardly from the mirror surface and function as holders for tubular or bulb lamps 13.

The mirror surface 7 and the reflective parts 14 located externally of the actual mirror surface 7 itself are framed by a plastic frame 15 which is glued to the front of the mirror and covers the electrical contact plates 10, 11. "Lamp glass" in the form of two transparent plastic plates 16, which are surface structured to provide the desired distribution of light, are provided with fastener devices (not shown) which co-act with the frame 15 in a manner which will enable the transparent plates to be snapped onto the frame and cover the side parts 14 of the mirror and the lamps or bulbs 13. That part of the frame 15 which is located above the mirror surface 7 is configured to form a housing 17 which accomodates journals for the bearing shafts 18 of the cover 9 and a mechanism which enables the cover 9 to be held stably in mutually different positions. This mechanism may include spring devices, camming elements and/or friction elements.

Because all components are carried on the front of the mirror 6, the rear surface of the insert 5 will be completely smooth, thereby enabling the insert to be glued firmly to a planar bottom surface in the recess 4. This construction can be installed easily and safely and will prevent the scatter of broken glass should the mirror be broken as a result of being struck by the head of a vehicle occupant or broken in some other way. Moreover, the inventive construction assists in reducing the number of components normally required, inter alia by obviating the need of separate reflectors for the lighting units 8, since the function of such reflectors is fulfilled by the reflective surface parts 14 of the mirror.

What is claimed:

1. A sun visor assembly for a vehicle comprising an elongated visor body and a mirror and lighting assembly attached to the visor body, said mirror comprising a mirror plate the back side of which is glued directly onto the visor body, said lighting assembly comprising a lamp-holder with electrical contact means, said lighting assembly being glued directly onto the front surface of the mirror plate so as to hold an associated lamp in front of the front surface of the mirror plate, thereby making the mirror plate serve as a reflector for the lamp.

2. An assembly according to claim 1, wherein journal means (17) for pivotal mounted of a cover (9) are affixed directly onto the mirror plate (6), said cover (9) when lowered being effective to cover at least the mirror surface (7) located by the side of the lighting assembly (8).

3. An assembly according to claim 1, including a frame (15) which is glued directly onto the front surface of the mirror plate and which serves as a carrier for a transparent plate (16) covering said lamp (13).

4. An assembly according to claim 3, wherein the frame (15) comprises a unit which frames the whole of the mirror plate (6) and two said lamps (8) located on respective sides of a central mirror surface (7) and which has journal means (17) for pivotally journalling a cover (9) which when lowered covers at least said central mirror surface.

5. An assembly according to claim 1, wherein said elongated body is of foamed plastic and the mirror plate (6) is glued directly onto a foamed plastic surface in a recess (4) in said body (1).

* * * * *